United States Patent
Monteith

[19]

[11] Patent Number: 5,849,181
[45] Date of Patent: Dec. 15, 1998

[54] CATCH BASIN

[75] Inventor: Joseph Gordon Monteith, Etobicoke, Canada

[73] Assignee: Stormceptor Corporation, Rockville, Md.

[21] Appl. No.: 867,049

[22] Filed: Jun. 2, 1997

[51] Int. Cl.[6] .............................. B01D 71/02; C02G 1/40
[52] U.S. Cl. .................. 210/163; 210/164; 210/170; 210/254; 210/521; 210/538; 210/532.1
[58] Field of Search ................................. 210/163, 164, 210/170, 521, 532.1, 538, 254

[56] References Cited

U.S. PATENT DOCUMENTS

| | | | |
|---|---|---|---|
| 325,231 | 9/1885 | Badgley | 210/163 |
| 2,136,945 | 11/1938 | Klein | 210/164 |
| 3,374,894 | 3/1968 | Webster | 210/532.1 |
| 4,136,010 | 1/1979 | Pilie et al. | 210/164 |
| 4,261,823 | 4/1981 | Gallagher et al. | 210/164 |
| 4,985,148 | 1/1991 | Monteith | 210/532.1 |
| 5,032,264 | 7/1991 | Geiger | 210/163 |
| 5,405,539 | 4/1995 | Schneider | 210/170 |
| 5,433,845 | 7/1995 | Greene et al. | 210/170 |
| 5,490,922 | 2/1996 | Gresa | 210/170 |
| 5,498,331 | 3/1996 | Monteith | 210/170 |
| 5,531,888 | 7/1996 | Geiger et al. | 210/170 |
| 5,643,445 | 7/1997 | Billina et al. | 210/163 |

*Primary Examiner*—Christopher Upton
*Attorney, Agent, or Firm*—Shoemaker and Mattare, Ltd.

[57] ABSTRACT

An improved catch basin is constituted by a cylindrical container with a partition dividing the internal volume into a lower compartment and an upper compartment. The partition includes an intake region and an outlet region, each communicating with a vertical pipe extending downwardly from the partition and opening into the lower treatment chamber at an intermediate location therein, the intake region and the outlet region being diametrically opposite one another. The partition defines a central, oblique ramp which urges entering liquid in the direction of the intake opening of the intake region. Thus, under conditions of low liquid flow into the catch basin, all entering liquid will be directed to the intake region, descending along the intake conduit and into the lower compartment. Conversely, under conditions of high liquid flow into the catch basin, a portion of the liquid will overrun the ramp and gain direct access to the outlet region, from which it will exit the catch basin.

7 Claims, 2 Drawing Sheets

CATCH BASIN

This invention relates generally to separator tanks or catch basins, sometimes called interceptors, adapted to receive primarily rainwater from a storm sewer or drain, and additionally to perform the function of separating and entrapping any oil- or gasoline-based materials and suspended solids that may enter, allowing the water fraction to discharge into municipal receiving sewers.

PRIOR ART

Prior art devices of the kind described above are typically equipped with various baffles and chambers operating in such away as to collect specific components of the waste fluid and separate them from others. One representative prior patent is U.S. Pat. No. 4,136,010, issued Jan. 23, 1979 to Pilie et al.

An improved construction for a separator tank is the focus of U.S. Pat. No. 4,985,148, issued Jan. 15, 1991 to Joseph G. Monteith. The purpose of the tank interceptor set forth in the latter patent is to provide two distinct responses to two different operating conditions:

(1) When the materials entering the interceptor include discharge from a service station, garage, machine shop, factory or the like, or oil that has spilled accidentally, these non-aqueous materials are collected within the interceptor. The aqueous fraction is allowed to leave the interceptor and pass on to a storm sewer or the like, but the liquid fraction-made up of oil or fat of animal, vegetable or mineral origin, gasoline and the like remains trapped within the interceptor until the same is pumped out. Further, any heavier-than-water materials sink to the bottom of the interceptor and are confined to a particular location from where they can also be pumped out at intervals.

(2) The interceptor of the prior invention is also adapted to deal with inflow resulting from heavy rain during a storm. Such inflow would typically be a combination of storm drainage from an adjacent industrial property, garage or the like, as well as inflow from storm drains adapted to catch rainwater. When a large quantity of rainwater arrives at the interceptor of the prior invention, the interceptor automatically diverts most of this flow directly to an outlet opening which passes it directly to a storm sewer. Only a portion of the flow of the incoming rainwater is allowed through the treatment/storage chamber of the interceptor.

To accomplish the aforesaid goals, the prior art separator disclosed in U.S. Pat. No. 4,985,148 provides, within the tank-like interceptor, a passageway extending substantially directly between the inlet and the outlet. The passageway is essentially sealed from communication with the remainder of the interior of the tank interceptor, except for an opening adjacent the inlet and an opening adjacent the outlet. Each opening communicates the passageway with the remainder of the tank interior, which may be regarded as a treatment chamber. Finally, a weir means is provided within the passageway, disposed with respect to the first opening such that, under relatively low entry flow rates, all entering materials are contained by the weir and flow through the first opening and into the treatment chamber, whereas under relatively high entry flow rates, part of the entering materials overflow the weir and are delivered by the passageway to the outlet.

Recognizing that it was unnecessary for the entire volume inside the interceptor tank (except for the passageway means) to be used as a treatment chamber, and in view of the desirability that the structure providing the high-flow passageway be more fully accessible to personnel wishing to inspect the installation for damage, or the improper accumulation of materials, I developed a design in which a separator tank provided a treatment compartment in the bottom portion thereof and a convenient area above the treatment compartment where inspection personnel could stand. The separation is accomplished by a partition integrally defining a weir encouraging all fractions of a low liquid inflow to pass downwardly into the treatment compartment but which, under high flow rates, permits entering liquid to pass directly across and above the partition to an outlet, effectively overrunning the built-in weir. The latter development is now the focus of U.S. Pat. No. 5,498,331, issued Mar. 12, 1996, entitled "Tank Interceptor".

I have now developed a compact, inexpensive and effective design for a catch basin intended to separate inflowing liquid into an aqueous fraction, a floatable fraction above the aqueous fraction, and precipitating sediments, solids, etc., but which under high flow rates of entering liquid (as may occur during a rainstorm) permits entering liquid to pass directly to the outlet with only a very small fraction entering the lower treatment chamber.

Due to the design, any portion of the high-velocity entering liquid which does enter the lower treatment compartment will do so at a controlled rate of speed which allows the separated fractions to remain separated.

GENERAL DESCRIPTION OF THIS INVENTION

More particularly, this invention provides an improved catch basin, comprising:

a hollow container having a bottom wall, a side wall and a top wall which together define an internal volume, an inlet in said top wall, an outlet in said side wall, partition means dividing the internal volume into a lower compartment and an upper compartment, the partition means including:

an intake region disposed so as to directly receive at least a portion of the liquid entering through said inlet, an outlet region disposed adjacent said outlet in the side wall, and positioned so as to substantially prevent it from directly receiving any liquid entering through said inlet, an intake opening in said intake region, an outlet opening in said outlet region, directing means adjacent said intake region so disposed that the intake region and the directing means, between them, receive substantially all of the liquid entering through said inlet, the directing means being configured to direct liquid impinging thereon toward said intake opening, but so as to allow liquid entering in large quantity to pass directly to the outlet region;

an intake conduit connected to said intake opening, and extending downward into the lower compartment to an intermediate location therein, where it communicates with the lower compartment, an outlet conduit connected to said outlet opening, and extending downward into the lower compartment to an intermediate location therein, where it communicates with the lower compartment, the inlet region including two vertical guide plates, one on either side of said intake opening, for the purpose of creating a vortex which draws floatables into the intake opening, whereby, under conditions of low liquid flow into the catch basin, substantially all entering liquid will be directed to said intake region, will descend along the intake conduit into the lower compartment, and will separate into floatables on top, an aqueous phase under the floatables, and solids collecting on the bottom wall;

and whereby, under conditions of high liquid flow into the catch basin, a portion of the liquid will overrun the directing means, gain direct access to the outlet region, and exit from the catch basin through the outlet.

BRIEF DESCRIPTION OF THE DRAWINGS

Two embodiments of this invention are illustrated in the accompanying drawings, in which like numbers denote like parts throughout the several views, and in which.

and

Figure 2:
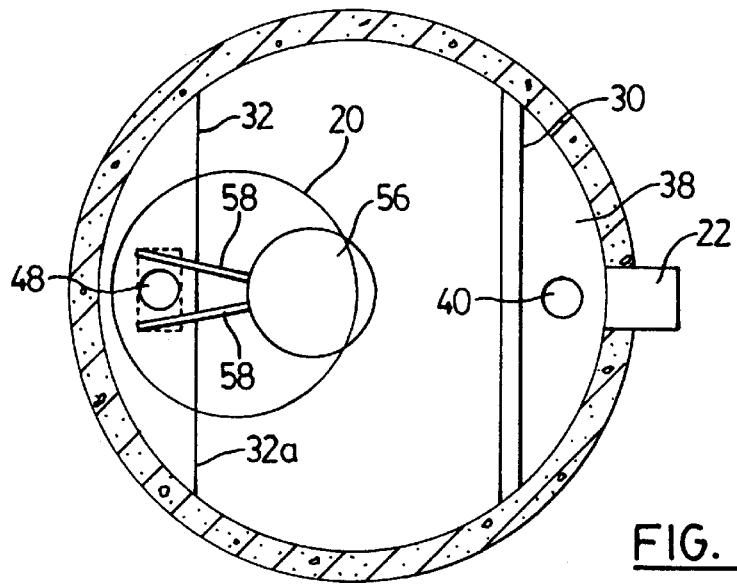
FIG. 2 is a horizontal cross-sectional view taken at the line 2—2 in FIG. 1.
Figure 1:
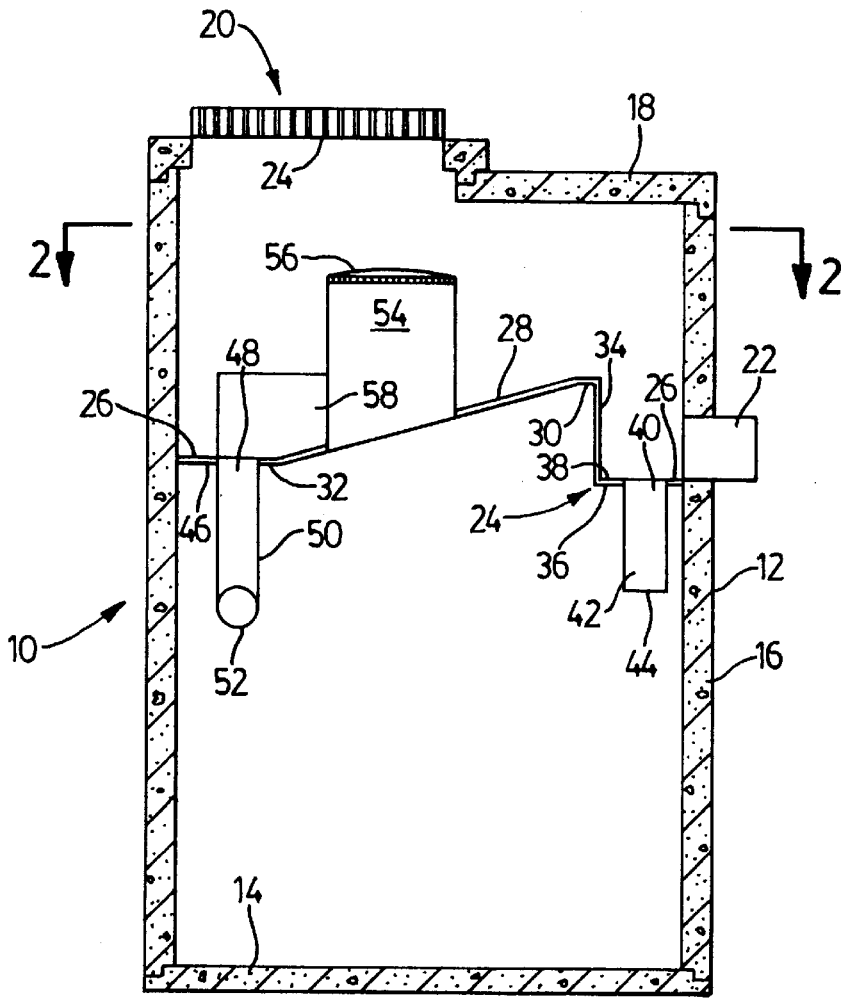
FIG. 1 is a vertical, axial sectional view taken axially through a first embodiment of a catch basin according to the present invention.
Figure 4:
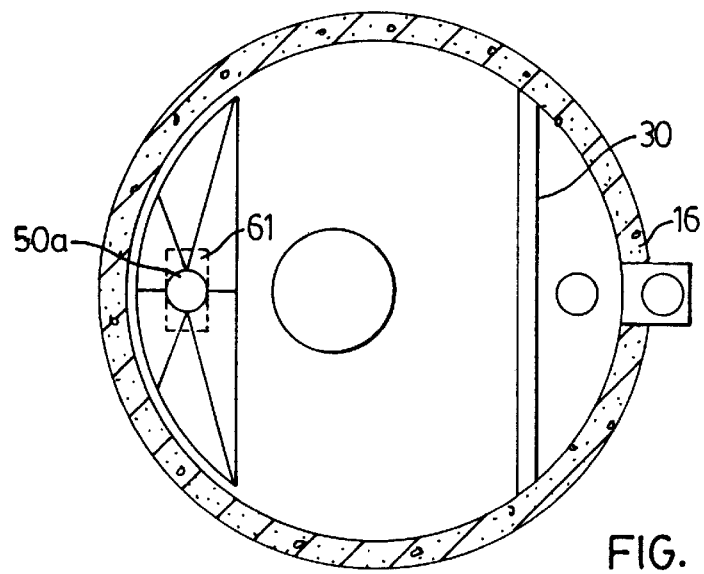
Figure 3:
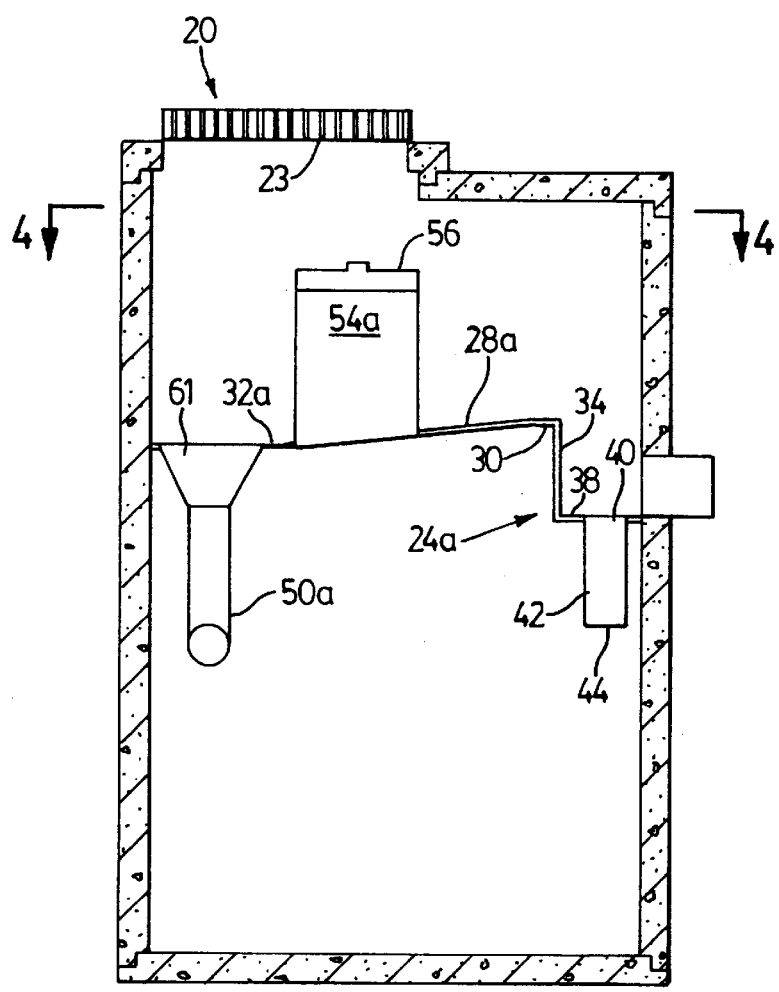

FIGS. 3 and 4 illustrate a second embodiment of a catch basin according to the present invention, and correspond to FIGS. 1 and 2.

DETAILED DESCRIPTION OF THE DRAWINGS

Attention is first directed to FIG. 1, which shows a first embodiment of a catch basin generally at the numeral 10, the catch basin 10 having the shape of a hollow container 12 with a substantially circular bottom wall 14, a cylindrical side wall 16, and a circular top wall 18.

There is an inlet 20 in the top wall 18, and an outlet 22 in the side wall 16.

The inlet 20 is an open grate 23, typically of cast iron. It will be noted that the inlet 20 is eccentrically located with respect to the circular top wall 18, and that its direction of displacement is opposite that of the outlet 22.

A partition shown generally at the numeral 24 has a substantially circular outer perimeter 26 which is sized to fit snugly within the cylindrical side wall 16.

The partition 24 has its mid-region shaped to define an obliquely inclined sloping ramp 28 extending leftwardly and downwardly from a substantially horizontal upper edge 30 to a horizontal lower edge 32. A substantially vertical wall 34, rectangular in configuration, extends downwardly from the upper edge 30 to a lower edge 36 defining a rectilinear internal limit of an outlet region 38 having the shape of a circular segment. There is an outlet opening 40 located substantially centrally of the outlet region 38, the outlet opening constituting the upper end of an outlet conduit 42 which extends substantially vertically downward adjacent the cylindrical side wall 16, the outlet conduit 42 terminating at an open bottom end 44.

The partition 24 further defines an intake region 46 which is disposed diametrically opposite the outlet platform 38, and which likewise has the form of a circular segment including a rectilinear inner edge defined by the lower, leftward limit of the ramp 28. Provided in the intake region 46 is an intake opening 48 communicating with the top of an intake conduit 50 which has a bottom end in communication with a T-fitting 52 shaped so as to direct liquid which descends along the intake conduit 50 in tangential directions around the inside of the circular side wall 16, thus promoting laminar flow rather than turbulence.

By suppressing turbulence, the floatable fraction of the incoming material can separate from the aqueous fraction and float upwardly to collect under the partition 24, trapped in that location by the vertical extent of the conduits 42 and 50. At the same time, solids will tend to precipitate and collect against the bottom wall 14.

In the embodiment illustrated, the catch basin provides a clean-out access means in the form of an upstanding pipe 54 with a closure 56 for the top the part 54, the closure 56 allowing air to escape from the lower compartment as the latter fills with liquid, but substantially preventing the entry, into the lower compartment, of liquid that directly arrives from the inlet 20 in the top wall 18.

It will also be noted that the inlet region 46 and the adjacent part of the ramp 28 support two vertical guide plates 58 which extend leftwardly from the pipe 54 and enclose the intake opening 48 on two sides thereof. The purpose of the two vertical guide plates 58 is to create a vortex which draws floatables into the intake opening 48.

It will be noted that the outlet region 38 has a slightly lower vertical position than does said intake region 46. This difference in height (of approximately one inch) will tend to promote outflow through the outlet conduit 42 and the outlet 22.

It will thus be appreciated that, under conditions of low liquid flow into the catch basin 10 (the liquid descending directly from the grate 23 in the top wall 18), substantially all of the entering liquid will be directed to the intake region 46, will descend along the intake conduit 50 into the lower compartment, and will tend to separate into floatables on top, an aqueous phase under the floatables, and solids collecting on the bottom wall 14. Entering liquid which impinges directly on the closure 56 will run off the closure 56 and down along the outside of the pipe 54, eventually finding its way to the intake opening 48. The remaining water entering through the grate 23 will end up going through the intake opening 48, due to the action of the ramp 28 and the guide plates 58.

However, under conditions of a high liquid flow into the catch basin 10, a portion of the entering liquid will build up (due to the restriction represented by the opening 48) and eventually overrun the ramp 28, thereby gaining direct access to the outlet region 38 from which it can leave the catch basin through the outlet 22.

Attention is now directed to FIGS. 3 and 4, showing the second embodiment of this invention. The primary difference between the first and second embodiments illustrated in the Figures relates to the configuration of the ramp, identified by the number 28 in FIG. 1, and by the number 28a in FIG. 3. It will be noted that the ramp 28a in FIG. 3 defines a smaller angle with respect to the horizontal than does the ramp 28 in FIG. 1. This places the leftward edge 32a of the ramp 28a at a higher vertical position than the edge 32. Leftwardly from the edge 32a, the partition 24a incorporates a downwardly converging throat portion 61 which communicates with the top of the intake conduit 50a. The downwardly converging throat portion 61 promotes the creation of a vortex which allows floatables such as oil to enter the lower treatment chamber through the intake conduit 50a.

The remaining components of the second embodiment of this invention correspond in configuration and function to the equivalent components discussed above with reference to FIGS. 1 and 2.

While two embodiments of this invention have been illustrated in the accompanying drawings and described hereinabove, it will be evident to those skilled in the art that changes and modifications may be made therein, without departing from the invention as set forth in the appended claims.

The embodiments of the invention in which an exclusive property or privilege is claimed are defined as follows:

1. An improved catch basin, comprising:

a hollow container having a bottom wall, a side wall and a top wall which together define an internal volume, an inlet in said top wall, an outlet in said side wall, partition means dividing the internal volume into a lower compartment and an upper compartment, the partition means including:

an intake region disposed so as to directly receive at least a portion of the liquid entering through said inlet, an outlet region disposed adjacent said outlet in the side wall, and positioned so as to substantially prevent it from directly receiving any liquid entering through said inlet, an intake opening in said intake region, an outlet opening in said outlet region, directing means adjacent said intake region so disposed that the intake region and the directing means, between them, receive substantially all of the liquid entering through said inlet, the directing means being configured to direct liquid impinging thereon toward said intake opening, but so as to allow liquid entering in large quantity to pass directly to the outlet region;

an intake conduit connected to said intake opening, and extending downward into the lower compartment to an intermediate location therein, where it communicates with the lower compartment, an outlet conduit connected to said outlet opening, and extending downward into the lower compartment to an intermediate location therein, where it communicates with the lower compartment, the inlet region including two vertical guide plates, one on either side of said intake opening, for the purpose of creating a vortex which draws floatables into the intake opening, whereby, under conditions of low liquid flow into the catch basin, substantially all entering liquid will be directed to said intake region, will descend along the intake conduit into the lower compartment, and will separate into floatables on top, an aqueous phase under the floatables, and solids collecting on the bottom wall;

and whereby, under conditions of high liquid flow into the catch basin, a portion of the liquid will overrun the directing means, gain direct access to the outlet region, and exit from the catch basin through the outlet.

2. The catch basin claimed in claim 1, in which the directing means has the form of a sloping ramp obliquely inclined downward toward the intake region, the catch basin further having a clean-out access means opening through the sloping ramp.

3. The catch basin claimed in claim 2, in which the clean-out access means has the form of a pipe extending upward from the sloping ramp, with a closure for the top of the pipe, the closure allowing air to escape from the lower compartment as it fills with liquid, but substantially preventing the entry, into the lower compartment, of liquid that directly arrives from the inlet in the top wall.

4. The catch basin claimed in claim 1, claim 2 or claim 3, in which the inlet region includes a downwardly converging throat portion communicating with said intake conduit.

5. The catch basin claimed in any one of claims 1 to 3, in which the outlet region has a slightly lower vertical position than does said intake region.

6. The catch basin claimed in claim 1, in which the directing means has the form of a sloping ramp obliquely inclined downward toward the intake region from a substantially horizontal upper edge, the partition means further defining a substantially vertical wall extending downward from said horizontal upper edge to said outlet region.

7. The catch basin claimed in claim 2 or claim 3, in which said sloping ramp is inclined downward from a substantially horizontal upper edge, the partition means further defining a substantially vertical wall extending downward from said horizontal upper edge to said outlet region.

\* \* \* \* \*